(12) United States Patent
Domoto et al.

(10) Patent No.: US 11,306,844 B2
(45) Date of Patent: Apr. 19, 2022

(54) PILOT SOLENOID VALVE

(71) Applicant: LIXIL Corporation, Tokyo (JP)

(72) Inventors: Naoki Domoto, Tokyo (JP); Shinya Sakata, Tokyo (JP)

(73) Assignee: LIXIL Corporation, Tokyo (JP)

( * ) Notice: Subject to any disclaimer, the term of this patent is extended or adjusted under 35 U.S.C. 154(b) by 0 days.

(21) Appl. No.: 16/626,318

(22) PCT Filed: Jun. 19, 2018

(86) PCT No.: PCT/JP2018/023230
§ 371 (c)(1),
(2) Date: Dec. 23, 2019

(87) PCT Pub. No.: WO2019/004000
PCT Pub. Date: Jan. 3, 2019

(65) Prior Publication Data
US 2020/0378520 A1    Dec. 3, 2020

(30) Foreign Application Priority Data

Jun. 26, 2017 (JP) .............................. JP2017-124228
Mar. 28, 2018 (JP) .............................. JP2018-061945

(51) Int. Cl.
*F16K 31/06* (2006.01)
*F16K 31/40* (2006.01)
*F16K 1/42* (2006.01)
*F16K 27/00* (2006.01)
(Continued)

(52) U.S. Cl.
CPC ............ *F16K 31/0655* (2013.01); *F16K 1/42* (2013.01); *F16K 27/00* (2013.01); *F16K 27/02* (2013.01); *F16K 31/404* (2013.01); *F16K 31/0675* (2013.01); *F16K 31/406* (2013.01); *F16K 31/42* (2013.01)

(58) Field of Classification Search
CPC . F16K 1/42; F16K 27/00; F16K 27/02; F16K 31/40; F16K 31/402; F16K 31/42
USPC ....................................................... 251/30.02
See application file for complete search history.

(56) References Cited

U.S. PATENT DOCUMENTS 2,783,019 A * 2/1957 Houghton ............. F16K 31/406
                                                        251/30.02
4,503,887 A    3/1985 Johnson et al.
4,717,116 A    1/1988 Ishigaki
(Continued)

FOREIGN PATENT DOCUMENTS

CN    2056718 U    5/1990
CN    2278129 Y    4/1998
(Continued)

*Primary Examiner* — Matthew W Jellett
(74) *Attorney, Agent, or Firm* — Morrison & Foerster LLP (57) ABSTRACT

Provided is a pilot solenoid valve capable of bringing the strokes of a plunger to a necessary minimum and capable of achieving solenoid valve miniaturization and power saving. A pilot solenoid valve is provided with a diaphragm section, a primary side section, a secondary side section, a main valve, a back pressure chamber, a primary side auxiliary flow path, a secondary side auxiliary flow path, an auxiliary valve, and an auxiliary valve drive unit, wherein the secondary side auxiliary flow path is not formed in the main valve but rather is formed in the area around the main valve so as to bypass the main valve.

7 Claims, 10 Drawing Sheets

(51) Int. Cl.
*F16K 27/02* (2006.01)
*F16K 31/42* (2006.01)

(56) References Cited

U.S. PATENT DOCUMENTS

| | | | | |
|---|---|---|---|---|
| 4,848,721 | A | * | 7/1989 | Chudakov ............ F16K 31/406 |
| | | | | 251/30.02 |
| 5,069,420 | A | * | 12/1991 | Stobbs ...................... F16F 9/46 |
| | | | | 251/30.02 |
| 5,118,072 | A | | 6/1992 | Sakamoto et al. |
| 5,121,511 | A | | 6/1992 | Sakamoto et al. |
| 5,180,138 | A | | 1/1993 | Moldenhauer |
| 5,829,477 | A | * | 11/1998 | Graham ............ G05D 16/0663 |
| | | | | 137/454.2 |
| 5,915,665 | A | * | 6/1999 | Paese ........................ E03C 1/04 |
| | | | | 251/30.04 |
| 5,979,482 | A | | 11/1999 | Scott |
| 5,996,965 | A | * | 12/1999 | Eichholz ............... F16K 31/402 |
| | | | | 251/129.17 |
| 6,290,203 | B1 | * | 9/2001 | Kolze .................. F16K 31/402 |
| | | | | 251/30.02 |
| 7,931,252 | B2 | * | 4/2011 | Shindo ...................... F16K 1/34 |
| | | | | 251/333 |
| 8,336,848 | B2 | * | 12/2012 | Foglia .................. F16K 31/402 |
| | | | | 251/30.03 |
| 8,556,229 | B2 | * | 10/2013 | Lv ........................... F25B 41/31 |
| | | | | 251/129.11 |
| 8,740,177 | B2 | | 6/2014 | Walker |
| 9,140,378 | B2 | * | 9/2015 | Da Pont ............ F16K 31/402 |
| 10,302,216 | B2 | * | 5/2019 | Hausmann ................ F16K 1/32 |
| 2004/0222394 | A1 | | 11/2004 | Hall |
| 2007/0085047 | A1 | | 4/2007 | Donovan |
| 2007/0228069 | A1 | | 10/2007 | Onoe |
| 2008/0289693 | A1 | | 11/2008 | Irwin et al. |
| 2011/0024665 | A1 | | 2/2011 | Hajjar |
| 2011/0100619 | A1 | | 5/2011 | De Andrade Filho et al. |
| 2011/0248198 | A1 | | 10/2011 | Huang |
| 2013/0320250 | A1 | | 12/2013 | Graham et al. |
| 2015/0144815 | A1 | | 5/2015 | Walker |
| 2015/0323091 | A1 | | 11/2015 | Mccraven |
| 2017/0059075 | A1 | | 3/2017 | Ueno |
| 2018/0119840 | A1 | * | 5/2018 | Hishiya ................... F16K 25/00 |

FOREIGN PATENT DOCUMENTS

| | | | |
|---|---|---|---|
| CN | 2298397 | Y | 11/1998 |
| CN | 2348218 | Y | 11/1999 |
| CN | 2400653 | Y | 10/2000 |
| CN | 2426545 | Y | 4/2001 |
| CN | 2680943 | Y | 2/2005 |
| CN | 1332145 | C | 8/2007 |
| CN | 201028045 | Y | 2/2008 |
| CN | 201344281 | Y | 11/2009 |
| CN | 201416664 | Y | 3/2010 |
| CN | 201973326 | U | 9/2011 |
| CN | 102434702 | A | 5/2012 |
| CN | 202252252 | U | 5/2012 |
| CN | 202580235 | U | 12/2012 |
| CN | 203374900 | U | 1/2014 |
| CN | 203730901 | U | 7/2014 |
| CN | 203823202 | U | 9/2014 |
| CN | 203868403 | U | 10/2014 |
| CN | 203906839 | U | 10/2014 |
| CN | 204004697 | U | 12/2014 |
| CN | 104405950 | A | 3/2015 |
| CN | 104930253 | A | 9/2015 |
| CN | 202708184 | U | 1/2016 |
| CN | 204985828 | U | 1/2016 |
| CN | 204985945 | U | 1/2016 |
| CN | 204985946 | U | 1/2016 |
| CN | 105443835 | A | 3/2016 |
| CN | 205090061 | U | 3/2016 |
| CN | 205244464 | U | 5/2016 |
| CN | 105626937 | A | 6/2016 |
| CN | 205689872 | U | 11/2016 |
| DE | 1208960 | B | 1/1966 |
| DE | 1211450 | B | 2/1966 |
| DE | 3627543 | A1 | 3/1987 |
| DE | 3738853 | A1 | 5/1989 |
| DE | 3800557 | A1 | 7/1989 |
| DE | 29614645 | U1 | 10/1996 |
| DE | 20219358 | U1 | 4/2004 |
| DE | 29802369 | U1 | 6/2008 |
| DE | 102010037029 | A1 | 2/2012 |
| DE | 102011050617 | A1 | 12/2012 |
| DE | 102014108529 | A1 | 12/2015 |
| EP | 0047790 | A1 | 3/1982 |
| EP | 0373815 | A2 | 6/1990 |
| EP | 0930402 | A2 | 7/1999 |
| EP | 1150053 | A2 | 10/2001 |
| EP | 1508735 | | 1/2006 |
| EP | 2169288 | A1 | 3/2010 |
| JP | S48-77416 | A | 10/1973 |
| JP | S63-15886 | U | 2/1988 |
| JP | H10-115382 | A | 5/1998 |
| JP | H11-210922 | A | 8/1999 |
| JP | 2001-208238 | A | 8/2001 |
| JP | 2004-69045 | A | 3/2004 |
| JP | 2008-249143 | A | 10/2008 |
| JP | 2009-24780 | A | 2/2009 |
| JP | 4366035 | | 8/2009 |
| JP | 2010-185496 | A | 8/2010 |
| JP | 2011-085214 | A | 4/2011 |
| JP | 2011-511909 | | 4/2011 |
| JP | 2011-112148 | | 6/2011 |
| JP | 5252996 | | 7/2013 |
| JP | 5453175 | | 3/2014 |
| WO | 90/08279 | A1 | 7/1990 |
| WO | 03/056222 | | 7/2003 |
| WO | 2011/030279 | A1 | 3/2011 |
| WO | 2011/101832 | A2 | 8/2011 |

\* cited by examiner

PILOT SOLENOID VALVE

CROSS-REFERENCE TO RELATED APPLICATIONS

This application is a national stage application under 35 USC 371 of International Application No. PCT/JP2018/023230, filed Jun. 19, 2018, which claims the priority of Japanese Application No. 2017-124228, filed Jun. 26, 2017, and Japanese Application No. 2018-061945, filed Mar. 28, 2018, the entire contents of each of which are incorporated herein by reference.

FIELD OF THE DISCLOSURE

The present invention relates to a pilot solenoid valve.

BACKGROUND OF THE DISCLOSURE

In the related art, it has been known that a solenoid valve is provided in a flow path of a liquid and the opening and closing of the solenoid valve is controlled so as to control the flow of the liquid. One example of a solenoid valve is a pilot solenoid valve. The pilot solenoid valve includes, for example, a diaphragm, and in the pilot solenoid valve, an opening of an end portion of an auxiliary flow path is formed at an upper end of a diaphragm portion, and if the opening is open and closed by a plunger, a main flow path is open and closed by the diaphragm (for example, refer to Patent Document 1).

Patent Document 1: Japanese Patent No. 5453175

SUMMARY OF THE DISCLOSURE

However, in the above-mentioned conventional pilot solenoid valve, it is necessary to make the stroke of the plunger equal to or larger than the opening and closing stroke of the main flow path by the diaphragm portion. For this reason, since a large electromagnetic force is required, miniaturization and power saving of the solenoid valve cannot be expected.

Accordingly, disclosed is a pilot solenoid valve capable of minimizing a stroke of a plunger and miniaturization and power saving of the solenoid valve.

In some embodiments, there is provided a pilot solenoid valve including: a diaphragm portion (for example, a main valve 60 and a back pressure chamber 31 to be described later); a primary portion (for example, a primary flow path 111 and a primary space 103 to be described later) into which a liquid flows toward the diaphragm portion; a secondary portion (for example, a secondary flow path 112 and a secondary space 104 to be described later) from which a liquid from the diaphragm portion flows; a main valve (for example, a main valve 60 to be described later) which constitutes the diaphragm portion and switches an interruption and a communication between the primary portion and the secondary portion; a back pressure chamber (for example, a back pressure chamber 31 to be described later) which is formed on a rear surface side with respect to a communication side between the primary portion and the secondary portion in the main valve; a primary auxiliary flow path (for example, a small hole 615 to be described later) which is formed in the main valve and allows the liquid to flow from the primary portion to the back pressure chamber so as to increase a pressure inside the back pressure chamber; a secondary auxiliary flow path (for example, a through-hole 4612, a valve cover communication hole 305, a gap 113, and a valve base radial through flow path 1061 to be described later) which allows the liquid to flow from the back pressure chamber to the secondary portion; an auxiliary valve (for example, a plunger 45 to be described later) which switches an interruption and a communication between the back pressure chamber and the secondary auxiliary flow path; and an auxiliary valve drive unit (for example, a core 42, a coil 43, and a magnet 44 to be described later) which drives the auxiliary valve so as to perform the switching by the auxiliary valve, wherein the secondary auxiliary flow path is formed so as to bypass the main valve.

Further, in some embodiments, the pilot solenoid valve includes: a main body portion (for example, a valve base 10 and a valve cover 30 to be described later) which accommodates the main valve and in the main body portion, a secondary auxiliary flow path is formed between an outer surface of the main body portion and a fixed member to which the main body portion is fixed. Further, the pilot solenoid valve is preferably formed so as to be fixed to the fixed member including a flow path (for example, a tubular member primary flow path 908 to be described later) flowing into the primary portion and a flow path (for example, a tubular member secondary flow path 909 to be described later) discharged from the secondary portion. Further, in some embodiments, an upstream end portion of the secondary auxiliary flow path is provided with a valve seat (for example, a seat portion 4611 to be described later) which contacts the auxiliary valve and a downstream portion of the secondary auxiliary flow path in relation to the valve seat is provided with an enlarged diameter portion (for example, an enlarged diameter portion 4613 to be described later) which gradually increases in diameter.

In some embodiments, the upstream end portion of the secondary auxiliary flow path is provided with a valve seat which contacts the auxiliary valve and an opening peripheral edge portion of the valve seat which forms an opening of the upstream end portion of the secondary auxiliary flow path and contacts the auxiliary valve is provided with a reduced diameter portion (for example, a reduced diameter portion 4616 to be described later) which decreases in diameter from an upstream side toward a downstream side of the secondary auxiliary flow path. In some embodiments, the upstream end portion of the secondary auxiliary flow path is provided with a valve seat which contacts the auxiliary valve, a downstream portion of the secondary auxiliary flow path in relation to the valve seat is provided with an enlarged diameter portion which increases in diameter, the upstream end portion of the secondary auxiliary flow path is provided with a valve seat which contacts the auxiliary valve, an opening peripheral edge portion of the valve seat which forms an opening of the upstream end portion of the secondary auxiliary flow path and contacts the auxiliary valve is provided with a reduced diameter portion which decreases in diameter from an upstream side toward a downstream side of the secondary auxiliary flow path, and a diameter of a large diameter portion which is increased in diameter by the enlarged diameter portion is larger than a diameter of an upstream end of the reduced diameter portion in the secondary auxiliary flow path. In some embodiments, the main valve and the auxiliary valve are disposed coaxially.

In some embodiments, the pilot solenoid valve further includes: a main body portion which accommodates the main valve; and a valve seat which contacts the auxiliary valve, the main body portion includes a communication hole which penetrates the main body portion in a diameter direction, the auxiliary valve drive unit includes a coil portion with a coil for driving the auxiliary valve, and the coil portion includes the valve seat.

In some embodiments, the main valve includes a diaphragm which contacts a main valve seat portion and interrupts the primary portion and the secondary portion and a diaphragm plate which is fixed to the diaphragm and communicates the primary portion with the back pressure chamber, and an opening of the secondary auxiliary flow path toward the secondary portion is located on an upstream side in relation to a downstream end portion of the diaphragm plate in the flow of the liquid of the secondary portion.

In some embodiments, provided is a pilot solenoid valve capable of minimizing a stroke of a plunger and miniaturization or power saving of the solenoid valve.

DETAILED DESCRIPTION OF THE DISCLOSURE

Figure 1:
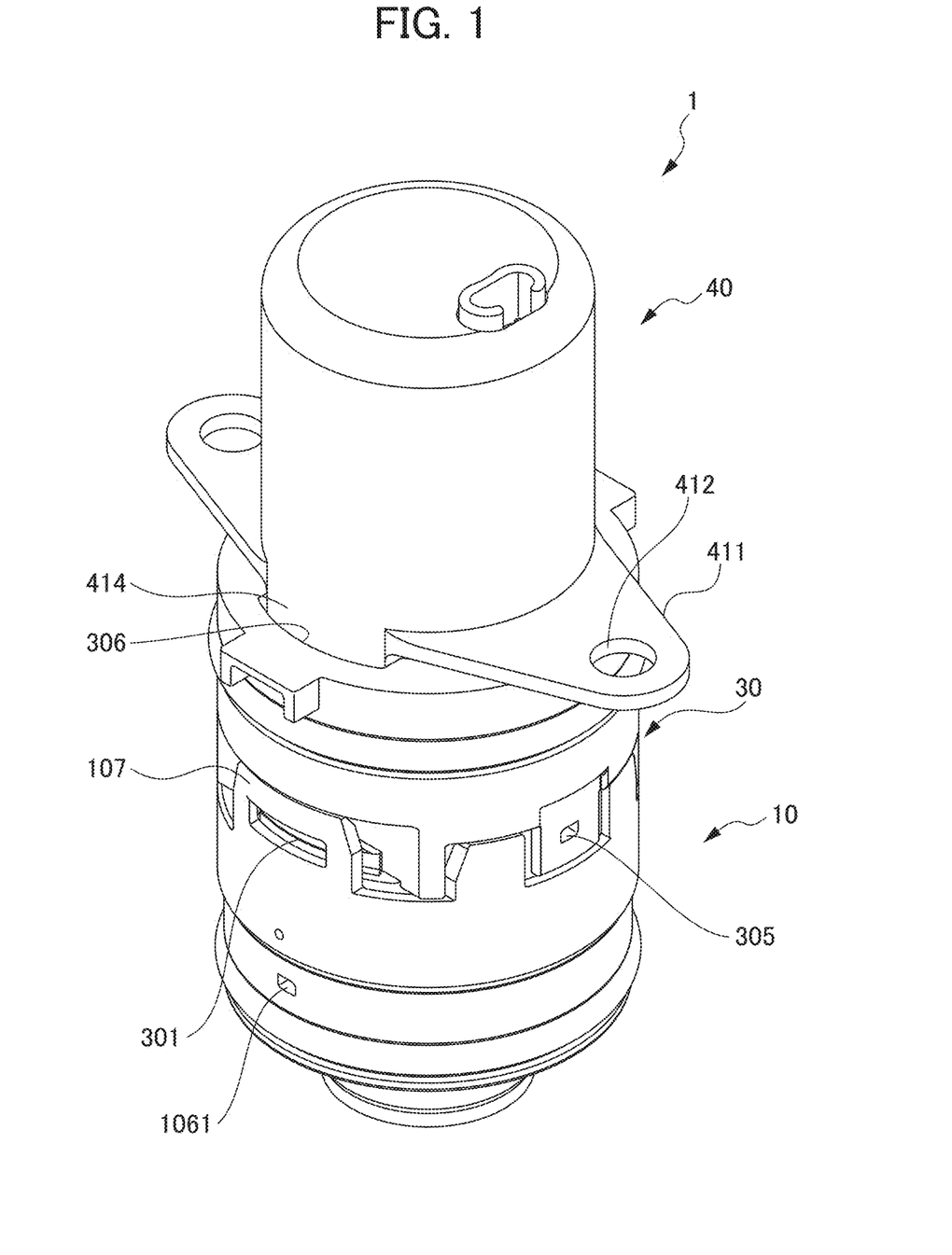
FIG. 1 is a perspective view illustrating a pilot solenoid valve 1, according to some embodiments.
Figure 2:
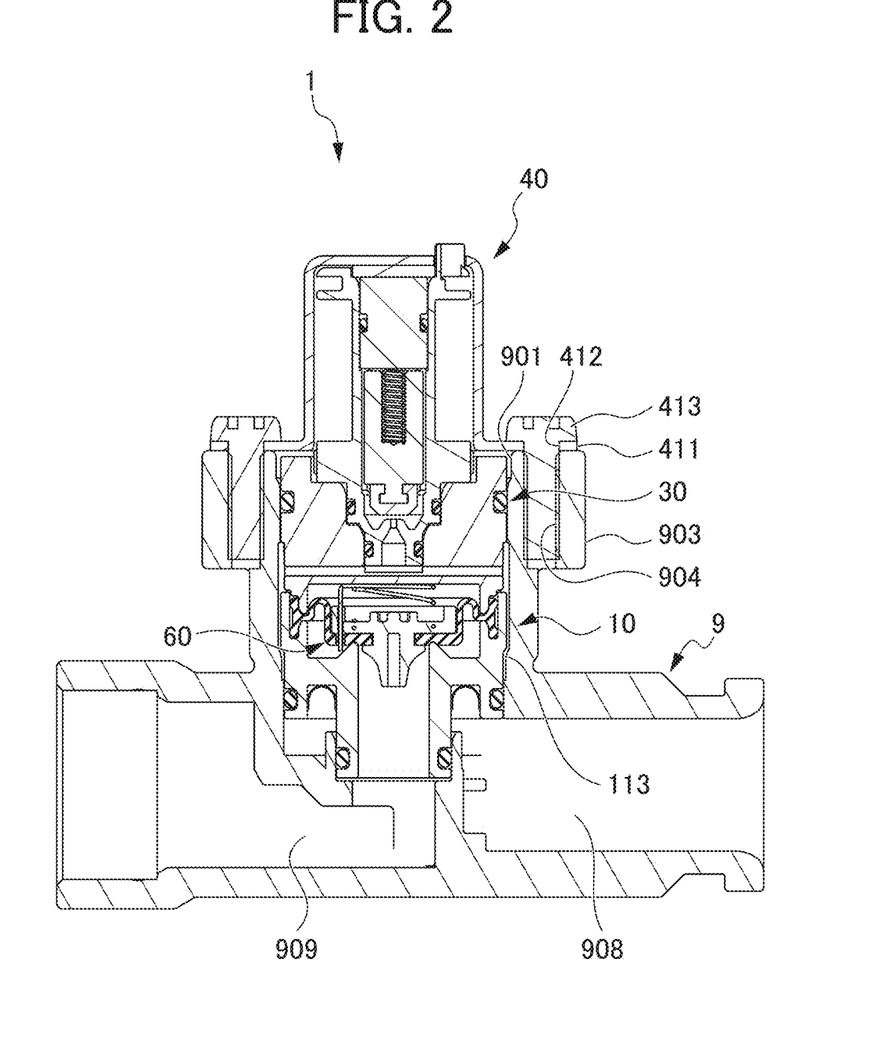
FIG. 2 is a cross-sectional view illustrating a state in which the pilot solenoid valve 1 is attached to a tubular member 9, according to some embodiments.
Figure 3:
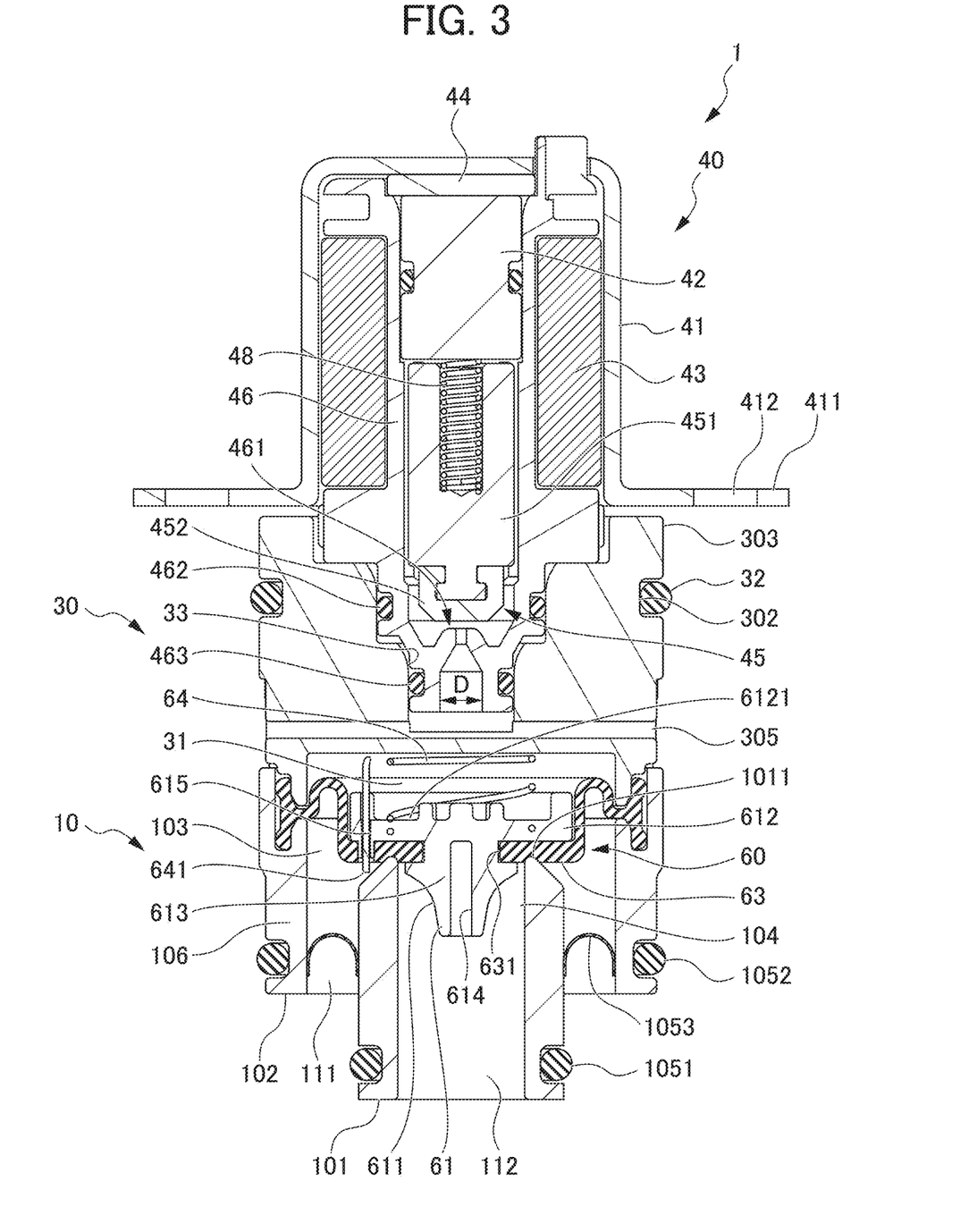
FIG. 3 is a cross-sectional view illustrating the pilot solenoid valve 1, according to some embodiments.
Figure 4:
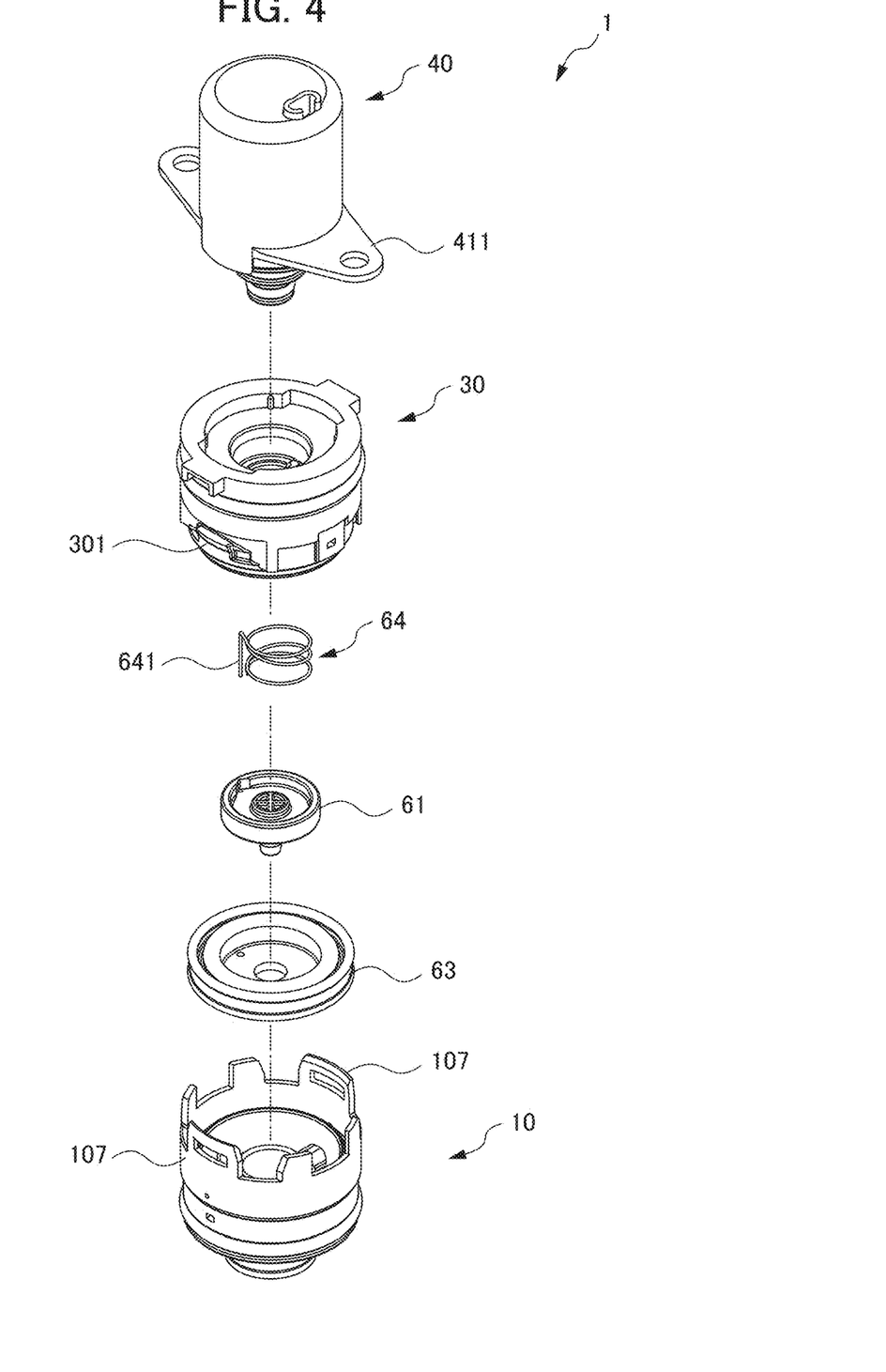
FIG. 4 is an exploded perspective view illustrating the pilot solenoid valve 1, according to some embodiments.

FIG. 1 is a perspective view illustrating the pilot solenoid valve 1, according to some embodiments. FIG. 2 is a cross-sectional view illustrating a state in which the pilot solenoid valve 1 is attached to a tubular member 9, according to some embodiments. FIG. 3 is a cross-sectional view illustrating the pilot solenoid valve 1, according to some embodiments. FIG. 4 is an exploded perspective view illustrating the pilot solenoid valve 1, according to some embodiments.

The pilot solenoid valve 1 includes, as illustrated in FIG. 1, a valve base 10, a valve cover 30, and a coil portion 40 and these are connected upward from below in this order as a cartridge type configuration. Namely, the pilot solenoid valve 1 is used while being fixed to the tubular member 9 after the valve base 10 and the valve cover 30 are inserted into an opening portion 901 of the tubular member 9 as illustrated in FIG. 2. The details of fixing the pilot solenoid valve 1 to the tubular member 9 will be described later.

The valve base 10 and the valve cover 30 form a main body portion. As illustrated in FIG. 3, the valve base 10 has an inner cylindrical portion 101 having a circular cylinder shape with a hollow inside, and an outer cylindrical portion 102 provided so as to surround an upper portion of the inner cylindrical portion 101. An external space (space between the inner cylindrical portion 101 and the outer cylindrical portion 102) of the inner cylindrical portion 101 forms a primary space 103 communicating with a primary flow path 111 through which a liquid flows toward the main valve 60 to be described later. The primary flow path 111 and the primary space 103 form a primary portion. An internal space of the inner cylindrical portion 101 forms a secondary space 104 communicating with a secondary flow path 112 through which the liquid from the main valve 60 to be described later flows. The secondary flow path 112 and the secondary space 104 form a secondary portion. The inner cylindrical portion 101 forms a partition wall formed between the primary space 103 and the secondary space 104. The thickness of an upper end portion of the inner cylindrical portion 101 in a radial direction of the inner cylindrical portion 101 gradually becomes thinner as the upper end portion approaches an upper end of the inner cylindrical portion 101. The upper end portion forms a main valve seat portion 1011 with which a diaphragm 63 is in contact at an upper end thereof.

O-rings 1051 and 1052 are respectively provided in a lower end portion of a lower portion of the valve base 10 and a lower end portion of an upper portion of the valve base 10. The O-rings 1051 and 1052 are respectively attached to a lower end portion of a lower portion of an inner cylindrical portion 101 and a lower end portion of an upper portion of an outer cylindrical portion 102 so as to go around. The O-ring 1051 stops the flowing of water between the primary flow path 111 and the secondary flow path 112. The O-ring 1052 stops the flowing of water between the primary flow path 111 and a secondary auxiliary flow path including a gap 113 and the like. A strainer 1053 is provided between the primary flow path 111 and the primary space 103. The strainer 1053 is, as illustrated in FIG. 3, curved in an upward direction, and is positioned and disposed at a predetermined position with respect to a connection portion 106. In addition, the upper portion of the inner cylindrical portion 101 is connected to the outer cylindrical portion 102 by the connection portion 106. The internal space of the inner cylindrical portion 101 communicates with an external space of the outer cylindrical portion 102 via a valve base radial through flow path 1061 (refer to FIG. 8) penetrating the inside of the connection portion 106 and penetrating the inner cylindrical portion 101 and the outer cylindrical portion 102. A pair of the connection portions 106 is provided at diameter positions of the inner cylindrical portion 101, respectively. For this reason, a pair of the valve base radial through flow paths 1061 also is formed at diameter positions of the inner cylindrical portion 101, respectively. A pair of hook locking portions 107 (refer to FIG. 1), each of which protrudes upward and has a through hole formed at the center, is provided in an upper end portion of the valve base 10 at diameter positions of the valve base 10, respectively. In addition, the main valve 60 is, as illustrated in FIG. 3 and the like, provided on an upper end surface of the valve base 10.

The main valve 60 includes a diaphragm plate 61 and the diaphragm 63. The diaphragm plate 61 is formed of resin by molding, and has a diaphragm plate lower portion 611 having a diameter increasing toward top; a diaphragm plate upper portion 612 having a diameter larger than the diameter of an upper end of the diaphragm plate lower portion 611; and a diaphragm plate intermediate portion 613 which is constricted and connects the diaphragm plate upper portion 612 to the diaphragm plate lower portion 611. A hole 614 having a circular column shape is formed in a part from the diaphragm plate lower portion 611 to the diaphragm plate intermediate portion 613 at an axial position of the part. The hole 614 extends from the center of the diaphragm plate lower portion 611 to a part of the diaphragm plate intermediate portion 613 in the upward direction.

The diaphragm plate upper portion 612 is provided with a small hole 615 constituting a primary auxiliary flow path. The small hole 615 is formed so as to penetrate the diaphragm plate upper portion 612 in the vertical direction and allows the primary space 103 to communicate with a back pressure chamber 31 to be described later. Water flows from the primary space 103 into the back pressure chamber 31 through the small hole 615 so that a pressure inside the back pressure chamber 31 is increased.

In addition, a spring engagement recess 6121 is formed in an upper end surface of the diaphragm plate upper portion 612. A lower end portion of a spring 64 is in contact and engages with the spring engagement recess 6121. An upper end portion of the spring 64 is in contact with a lower end surface of the valve cover 30 which forms a ceiling of the back pressure chamber 31. The spring 64 is a compression spring, and presses the main valve 60 downward and brings the diaphragm 63 into contact with the main valve seat portion 1011 of the upper end portion of the inner cylindrical portion 101. In the upper end portion of the spring 64, a tip part of the spring 64 extends in a horizontal direction, and further extends straight in a downward direction to form a cleaning pin 641. The cleaning pin 641 penetrates the small hole 615, and prevents clogging from occurring inside the small hole 615. A gap through which water is capable of flowing is formed between an inner peripheral surface of the small hole 615 and an outer peripheral surface of the cleaning pin 641. The gap forms the primary auxiliary flow path.

The diaphragm 63 is formed of a rubber material and has a circular shape. A peripheral edge portion of the diaphragm 63 is interposed between a peripheral edge portion of an upper end portion of the valve base 10 and a peripheral edge portion of a lower end portion of the valve cover 30 so as to be fixed thereto. Accordingly, the main valve 60 is accommodated by the main body portion including the valve base 10 and the valve cover 30. A portion near the center of the diaphragm 63 has, as illustrated in FIG. 3 and the like, a circular shape recessed downward and a through-hole 631 is formed at the center of the diaphragm 63. The diaphragm plate intermediate portion 613 of the diaphragm plate 61 penetrates the through-hole 631. In this way, the diaphragm plate 61 is supported by the circular portion of the diaphragm 63 recessed downward.

With this configuration, the diaphragm plate 61 is supported by the diaphragm 63 so as to be movable in the vertical direction. Since the diaphragm plate 61 moves downward along with the portion of the diaphragm 63 supporting the diaphragm plate 61 and contacts the main valve seat portion 1011 of the upper end portion of the inner cylindrical portion 101, the diaphragm plate lower portion 611 enters the secondary space 104 which is the internal space of the inner cylindrical portion 101 so that the primary space 103 and the secondary space 104 are interrupted. The diaphragm plate 61 moves upward along with the portion of the diaphragm 63 supporting the diaphragm plate 61 and moves away from the main valve seat portion 1011 of the inner cylindrical portion 101 so that the primary space 103 communicates with the secondary space 104.

The back pressure chamber 31 is formed between the upper surface of the diaphragm plate 61 and the lower surface of the valve cover 30. The back pressure chamber 31 is formed on a rear surface side with respect to the installation side of the diaphragm plate lower portion 611 in the diaphragm plate 61 of the main valve 60, that is, the side (the upper side of the diaphragm plate upper portion 612) of the diaphragm plate upper portion 612 communicating the primary space 103 with the secondary space 104. The back pressure chamber 31 constitutes the diaphragm portion together with the main valve 60. A pair of hook portions 301 is provided in the lower end portion of the valve cover 30 at the diameter direction position of the valve cover 30. The hook portion 301 engages with the through-hole of the hook locking portion 107 so as to be locked to the hook locking portion 107. Accordingly, the valve cover 30 is fixed to the valve base 10.

A groove 302 is formed at the upper side in relation to the center of the valve cover 30 in the vertical direction. The groove 302 is formed over the entire periphery of the valve cover 30. The groove 302 is provided with an O-ring 32. The O-ring 32 is attached so as to go around the valve cover 30. The O-ring 32 stops water so that water does not leak from the secondary auxiliary flow path including the gap 113 or the like to the outside. Namely, the water is stopped in the vertical direction of the secondary auxiliary flow path including the gap 113 by the O-ring 32 and the O-ring 1052. Further, an upper end wall portion 303 is provided right above the groove 302 over the entire periphery of the peripheral edge of the upper end portion of the valve cover 30.

A central recess 33 which is recessed downward is formed at the center of an upper surface of the valve cover 30. Two through holes 304 (refer to FIG. 6) extending in the upward direction are formed in the lower surface of the valve cover 30, which forms the ceiling of the back pressure chamber 31. A pair of the through holes 304 is formed at diameter positions with respect to the center of the back pressure chamber 31. An upper end portion of the through hole 304 opens in the upward direction in the vicinity of the central recess 33. In addition, a valve cover communication hole 305 through which the central recess 33 communicates with an external space of the valve cover 30 is formed in a side surface of a bottom portion of the central recess 33. The valve cover communication hole 305 is disposed in the peripheral direction of the valve base 10 and the valve cover 30 around the axes of the valve base 10 and the valve cover 30 at a positional relationship of 90° from the valve base radial through flow path 1061 and a pair of valve covers 30 is formed at the diameter position of the valve cover 30 so as to penetrate the valve cover 30 in the diameter direction of the valve base 10 constituting the main body portion. The valve cover communication hole 305 allows water inside the central recess 33 to flow in the periphery of the main body portion including the valve cover 30 and the valve base 10, more specifically, the gap 113 (see FIG. 2) formed over the entire periphery of the valve base 10 in the peripheral direction between the outer peripheral surface of the main body portion and the inner peripheral surface of the tubular member 9 illustrated in FIG. 2. In this way, since the gap 113 is formed over the entire periphery of the valve base 10 in the peripheral direction, the width of the gap 113 can be set to be smaller than the path width of the valve base radial through flow path 1061 or the valve cover communication hole 305. As a result, the size of the entire pilot solenoid valve 1 in the diameter direction is small.

The coil portion 40 includes a yoke 41 and an auxiliary valve drive unit having a core 42, a coil 43, and a magnet 44. In addition, the coil portion 40 includes a plunger 45 as an auxiliary valve which is driven by the auxiliary valve drive unit to switch between shutoff and communication of the back pressure chamber 31 from and with the secondary auxiliary flow path to be described later. The plunger 45 is stored inside a cylindrical member 46 having a circular cylinder shape, and is disposed coaxially with the main valve 60. Namely, an axis of the plunger 45 and an axis of the main valve 60 have a coincidental positional relationship. Here, "coaxial" and "matching positional relationship" mean not only completely "coaxial" and completely "matching positional relationship", but also substantially "coaxial" and "matching positional relationship" even when slightly deviating from "coaxial" and "matching positional relationship". The plunger 45 is supported by the cylindrical member 46 so as to be movable inside the cylindrical member 46 in the vertical direction. The plunger 45, namely, the auxiliary valve is driven by the auxiliary valve drive unit to switch between shutoff and communication of the back pressure chamber 31 from and with the secondary auxiliary flow path formed of the valve cover communication hole 305 and the like.

The yoke 41 has a cylindrical shape blocking the upper end portion and has a coaxial positional relationship with the cylindrical member 46. The core 42, the coil 43, the magnet 44, the cylindrical member 46, and the plunger 45 are accommodated in the internal space of the yoke 41 and the yoke 41 is fixed to the cylindrical member 46. The cylindrical member 46 is fixed to the valve cover 30 by press-inserting. The directions of the valve cover 30 and the yoke 41 in the peripheral direction of the valve cover 30 are determined by a protrusion portion 414 of the yoke 41 and a notch portion 306 of the valve cover 30. The lower end portion of the yoke 41 is provided with a fixed portion 411. A pair of fixed portions 411 is provided at the diameter position of the yoke 41, each has a plate-shaped triangular shape with chamfered corners as illustrated in FIG. 1 and the like, and each is provided with a through-hole 412. As illustrated in FIG. 2, a screw 413 penetrates the through-hole 412 of the fixed portion 411 from above and is threaded into a through-hole 904 of a fixing portion 903 provided in the side surface of the tubular member 9 so that the fixed portion 411 is fixed to the fixing portion 903. Accordingly, the pilot solenoid valve 1 is fixed to the tubular member 9. Namely, the pilot solenoid valve 1 is formed so as to be fixed to the tubular member 9 including the flow path (the tubular member primary flow path 908 on the upstream side of the primary flow path 111) flowing into the primary flow path 111 and the flow path (the tubular member secondary flow path 909 on the downstream side of the secondary flow path 112) flowing out of the secondary flow path 112.

As illustrated in FIG. 3, the coil 43 is wound on an outer periphery of the cylindrical member 46. The core 42 is disposed above the plunger 45. A spring 48 which is a compression spring is provided at an axial position of the plunger 45. The spring 48 is disposed in a hole that is formed at the axial position of the plunger 45 and extends along the axis of the plunger 45. The spring 48 biases the plunger 45 with respect to the core 42 in the downward direction. In addition, the magnet 44 is provided above the core 42.

The plunger 45 is held at an upper position by a magnetic force of the magnet 44. In addition, if electricity is supplied to the coil 43, the plunger 45 is moved to a lower position by a magnetic force of the coil 43. At that time, the magnetic force of the magnet 44 applied to the plunger 45 is weaker than a biasing force of the spring 48, and the plunger 45 is held at a lower position by the biasing force of the spring 48. Namely, the drive method of the auxiliary valve drive unit is a latch type in which the coil 43 is energized only when the auxiliary valve formed of the plunger 45 switches between an open state and a closed state. If electricity is supplied opposite to electricity supplied to move the plunger 45 from the upper position to the lower position, the plunger 45 moves from the lower position to the upper position.

Figure 6:
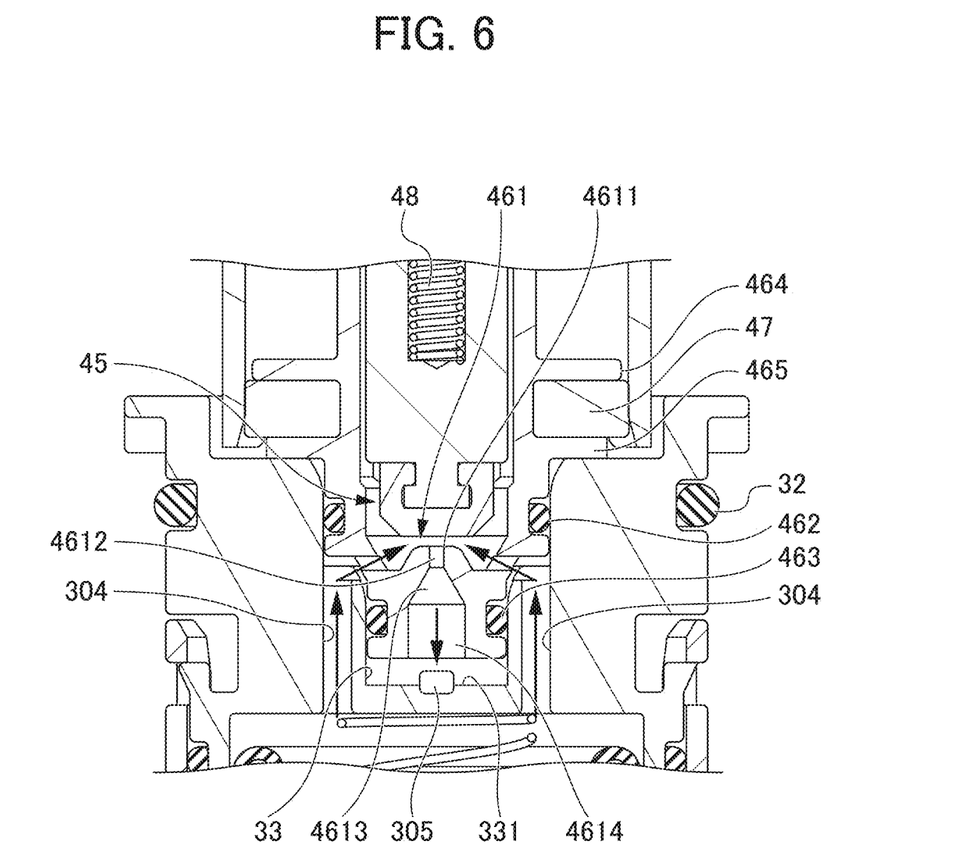
FIG. 6 is an explanatory diagram illustrating a state in which water flowing into a back pressure chamber 31 flows into a secondary auxiliary flow path in the pilot solenoid valve 1, according to some embodiments.

The lower portion of the cylindrical member 46 is provided with, as illustrated in FIG. 6, two plate-shaped portions 464 and 465 and the coil 43 is disposed above the upper plate-shaped portion 464. The lower plate 47 is disposed between the two plate-shaped portions 464 and 465. A lower end portion of the cylindrical member 46 has a valve seat portion 461 integrally molded with an upper portion of the cylindrical member 46 which supports the coil 43, and forming part of the cylindrical member 46. The valve seat portion 461 is provided in the lower end portion of the cylindrical member 46 so as to block an internal space of the cylindrical member 46. A gap between an outer peripheral surface of the valve seat portion 461 and a part of the valve cover 30 which forms the central recess 33 is sealed by two O-rings 462 and 463. The O-ring 462 shuts off water such that water flowing from the back pressure chamber 31 to the plunger 45 via the through hole 304 does not leak outward. The O-ring 463 shuts off the flow of water between a primary auxiliary flow path formed of the small hole 615 and the secondary auxiliary flow path formed of the valve cover communication hole 305 and the like.

Figure 9:
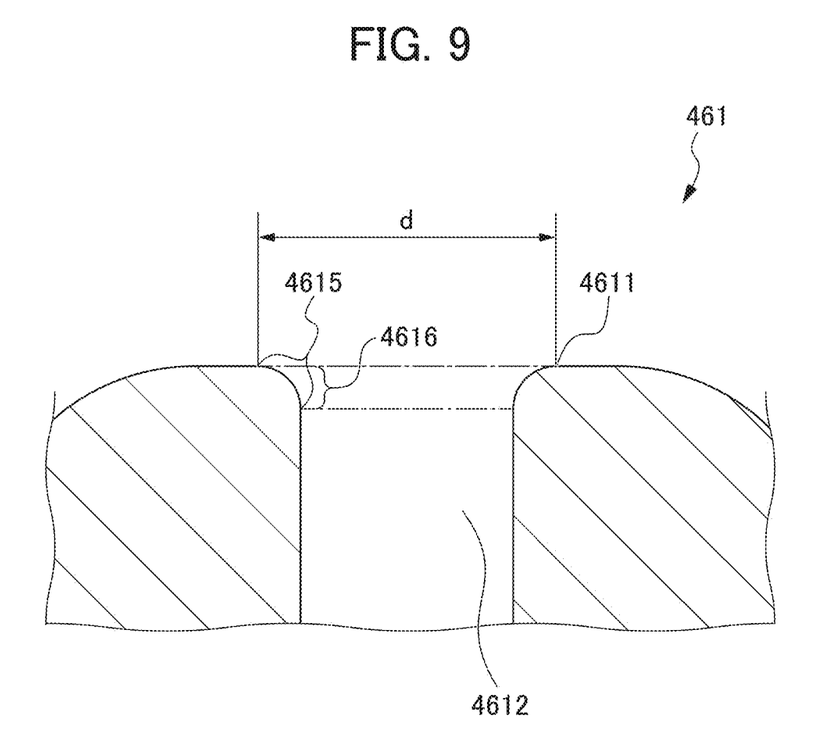
FIG. 9 is an enlarged cross-sectional view illustrating a seat portion 4611 of the pilot solenoid valve 1, according to some embodiments.
Figure 10:
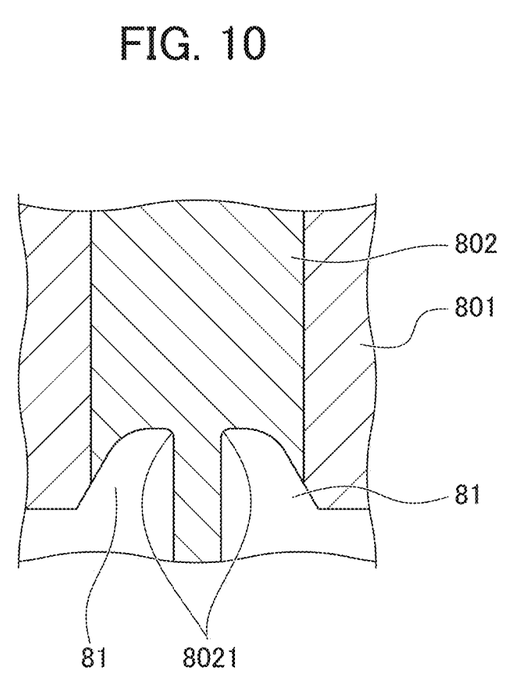
FIG. 10 is an enlarged cross-sectional view illustrating a part of a metal mold for molding the seat portion 4611 of the pilot solenoid valve 1, according to some embodiments.

The valve seat portion 461 has a seat portion 4611 (refer to FIG. 6) as a valve seat with which a lower end portion 452 of the plunger 45 comes into contact. An upper portion of the seat portion 4611 has a truncated cone shape. A through hole 4612 penetrating the seat portion 4611 in the vertical direction is formed at an axial position of the seat portion 4611. The peripheral edge portion of the opening of the upper end portion of the through-hole 4612 is formed by an R-shaped curved surface which is continuous from the inside to the outside of the opening. Namely, the upper end portion of the seat portion 4611 connected to the inner peripheral surface of the seat portion 4611 constituting the through-hole 4612 and the outer peripheral surface of the seat portion 4611 is formed by, as illustrated in FIGS. 6 and 9, an R-shaped curved surface 4615 which is continuous from the inner peripheral surface of the seat portion 4611 constituting the through-hole 4612 to the upper surface of the seat portion 4611. Accordingly, a reduced diameter portion 4616 is formed in the portion of the curved surface 4615 so as to decrease in diameter from the upstream side toward the downstream side of the secondary auxiliary flow path formed by the through-hole 4612. A diameter D (see FIG. 3) of the large diameter portion 4614 is larger than a diameter d of the upstream end of the reduced diameter portion 4616 of the secondary auxiliary flow path. The R-shaped curved surface 4615 is molded in, for example, as illustrated in FIG. 10, a cavity 81 by using a core 802 with an R-shaped cavity formation surface 8021 in a part of a movable die 801 of a metal mold for molding the upper surface of the seat portion 4611 (see FIG. 6). FIG. 9 is an enlarged cross-sectional view illustrating the seat portion 4611 of the pilot solenoid valve, according to some embodiments. FIG. 10 is an enlarged cross-sectional view illustrating a part of a metal mold for molding the seat portion 4611 of the pilot solenoid valve 1, according to some embodiments.

As illustrated in FIG. 6, in the through-hole 4612, a portion from the upper end portion of the seat portion 4611 to a predetermined position has a constant diameter and a portion on the lower side of that portion includes an enlarged diameter portion 4613 which gradually increases in diameter in a conical shape. Furthermore, a portion on the lower side of the enlarged diameter portion 4613 includes the large diameter portion 4614 having a constant diameter which is the same as the diameter of the portion of the largest diameter portion of the enlarged diameter portion 4613. A lower end portion of the seat portion 4611 is disposed at a position higher than the position of a bottom surface 331 of the central recess 33. Therefore, an internal space of the through hole 4612 of the seat portion 4611 communicates with the valve cover communication hole 305 via a space between the lower end portion of the seat portion 4611 and the bottom surface 331 of the central recess 33.

The through hole 4612 of the seat portion 4611, the valve cover communication hole 305, the gap 113 between outer surfaces of the valve cover 30 and the valve base 10 fixed to the tubular member 9, and the inner peripheral surface of the tubular member 9, and the valve base radial through flow path 1061 form the secondary auxiliary flow path through which water from the back pressure chamber 31 flows to the secondary space 104. Thus, the seat portion 4611 of the valve seat portion 461 is provided in the upstream end portion of the secondary auxiliary flow path and the enlarged diameter portion 4613 constitutes the downstream portion of the secondary auxiliary flow path in relation to the upper end portion of the seat portion 4611 corresponding to the valve seat. Then, the secondary auxiliary flow path is not formed in the main valve 60 and is formed in the periphery of the main valve 60 so as to bypass the main valve 60. More specifically, the gap 113 which is a path in the course of the secondary auxiliary flow path is formed in a bypassing manner in the periphery of the diaphragm 63 corresponding to a portion not overlapping a movable portion 632 (see FIG. 8) of the diaphragm 63 at an overlapping position of the upstream end (a portion indicated by the diameter d in FIG. 9) of the secondary auxiliary flow path, the movable portion 632 (see FIG. 8 and the like) of the diaphragm 63, and a downstream end 1062 (see FIG. 8) in the vertical direction. Then, the downstream end of the secondary auxiliary flow path corresponding to the opening of the secondary auxiliary flow path toward the secondary flow path 112 is located on the upstream side (the upper side in FIG. 8) in relation to the downstream end portion of the diaphragm plate 61 (in FIG. 8, the lower end portion 6111 of the diaphragm plate lower portion 611) in the flow of the water of the secondary space 104. Here, the downstream end of the secondary auxiliary flow path may not overlap the movable portion of the diaphragm when the upstream end of the secondary auxiliary flow path and the movable portion of the diaphragm are located at an overlapping position in the vertical direction. Also in this case, the upstream end of the secondary auxiliary flow path and the downstream end of the secondary auxiliary flow path do not communicate with each other by the secondary auxiliary flow path having a linear shape, but communicate with each other by the secondary auxiliary flow path formed so as to bypass the diaphragm due to the existence of the movable portion of the diaphragm.

Figure 5:
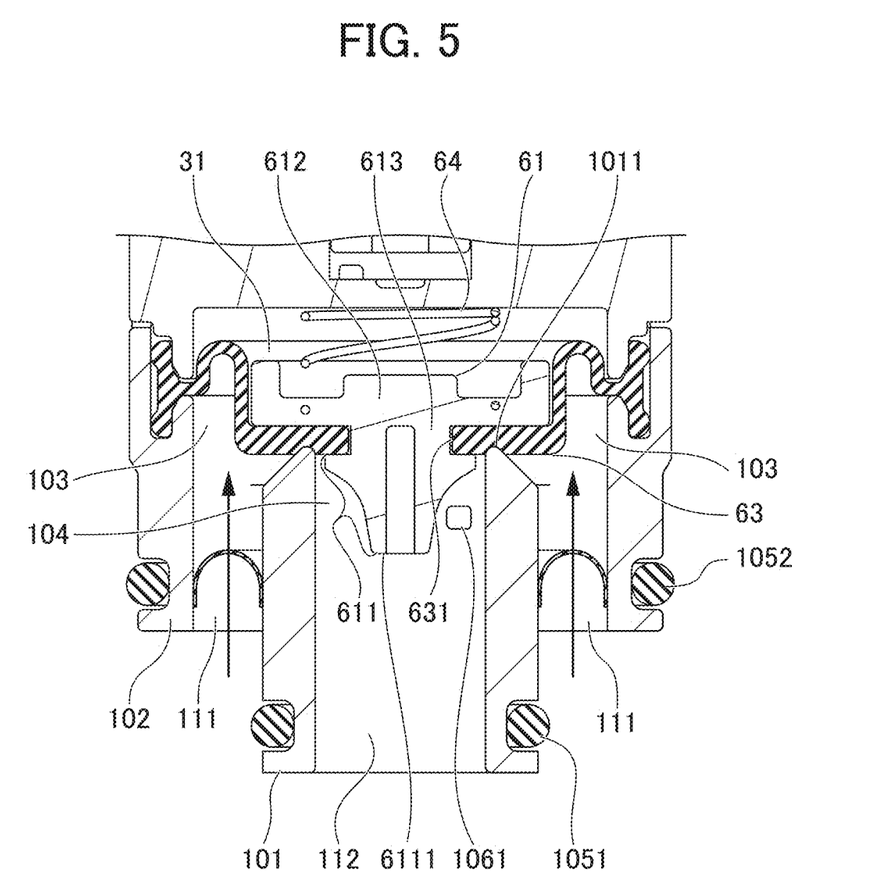
FIG. 5 is an explanatory diagram illustrating a state in which water flows from a primary flow path 111 into a primary space 103 in the pilot solenoid valve 1, according to some embodiments.
Figure 7:
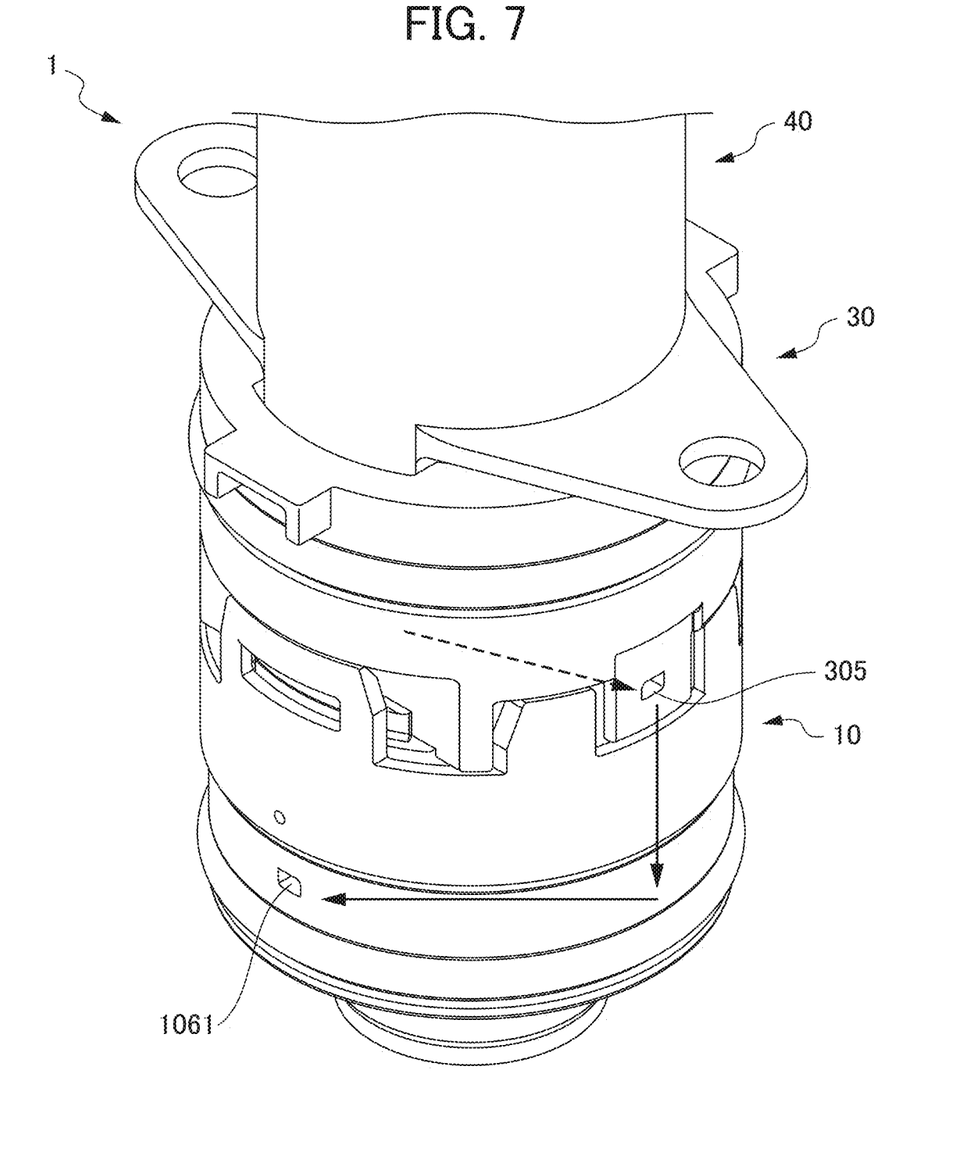
FIG. 7 is an explanatory diagram illustrating a state in which water flows through the secondary auxiliary flow path in the pilot solenoid valve 1, according to some embodiments.
Figure 8:
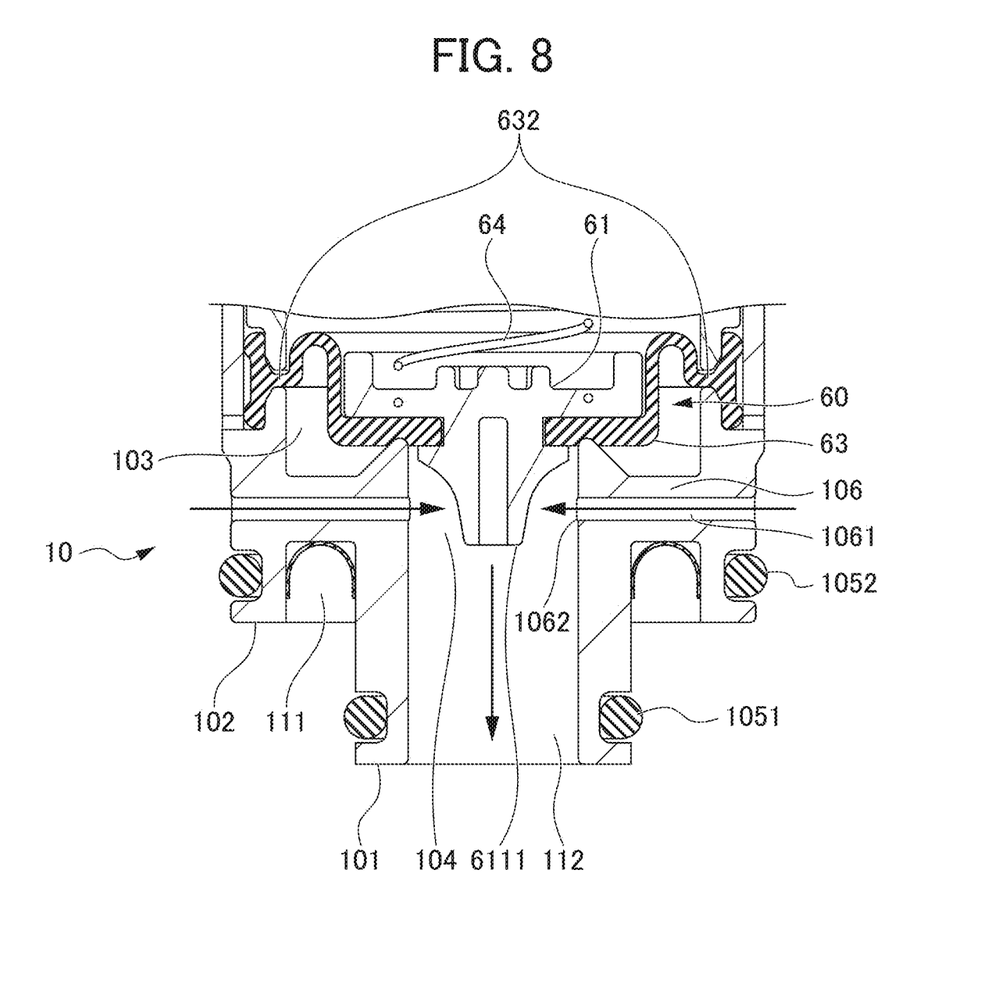
FIG. 8 is an explanatory diagram illustrating a state in which water flows from the secondary auxiliary flow path into a secondary space 104 in the pilot solenoid valve 1, according to some embodiments.

Subsequently, an open operation of the main valve 60 will be described. FIG. 5 is an explanatory diagram illustrating a state in which water flows from the primary flow path 111 into the primary space 103 in the pilot solenoid valve 1, according to some embodiments. FIG. 6 is an explanatory diagram illustrating a state in which water flowing into the back pressure chamber 31 flows into the secondary auxiliary flow path in the pilot solenoid valve 1, according to some embodiments. FIG. 7 is an explanatory diagram illustrating a state in which water flows through the secondary auxiliary flow path in the pilot solenoid valve 1, according to some embodiments. FIG. 8 is an explanatory diagram illustrating a state in which water flows from the secondary auxiliary flow path to the secondary space 104 in the pilot solenoid valve 1, according to some embodiments.

Firstly, a closed state before the main valve 60 is open will be described. In a state where the main valve 60 is closed, namely, when the main valve 60 blocks an opening of the main valve seat portion 1011 of the inner cylindrical portion 101, the plunger 45 blocks an opening of an upper end portion of the seat portion 4611 of the valve seat portion 461. At that time, water which has flown into the primary space 103 from the primary flow path 111 passes through the small hole 615, and flows into the back pressure chamber 31, and thus the back pressure chamber 31 is filled with the water. For this reason, the main valve 60 is biased in the downward direction by the pressure of the back pressure chamber 31 and the biasing force of the spring 64, and thus the main valve 60 is pressed against the main valve seat portion 1011 of the inner cylindrical portion 101, and a state where the opening is blocked is maintained.

Subsequently, the operation of opening the main valve 60 from a closed state will be described. If electricity is supplied to the coil 43 and the plunger 45 moves to the upper position against the biasing force of the spring 48, the opening of the upper end portion of the seat portion 4611 of the valve seat portion 461 is open. Therefore, the water inside the back pressure chamber 31 flows into the through hole 4612 from the opening of the upper end portion of the seat portion 4611, and flows out onto an outer peripheral surface of the valve cover 30 from the valve cover communication hole 305. Then, the water flows through between the valve cover 30 and the inner peripheral surface of the tubular member 9 and the gap 113 between the valve base 10 and the inner peripheral surface of the tubular member 9, flows into the valve base radial through flow path 1061, and flows into the secondary space 104 which is the internal space of the inner cylindrical portion 101. Then, the water flows to the secondary flow path 112. Therefore, the pressure of the back pressure chamber 31 decreases, the pressure of the primary space 103 becomes higher than the pressure of the back pressure chamber 31 and the biasing force of the spring 64, the main valve 60 moves in the upward direction, the main valve 60 is open, the primary space 103 communicates with the secondary space 104, and the water in the primary space 103 flows to the secondary space 104.

In some embodiments, the pilot solenoid valve 1 includes the diaphragm portion containing the main valve 60 and the back pressure chamber 31; the primary flow path 111 into which a liquid flows toward the diaphragm portion; the secondary flow path 112 from which the liquid from the diaphragm portion flows out; the main valve 60 that forms the diaphragm portion and switches between shutoff and communication of the primary space 103 from and with the secondary space 104; the back pressure chamber 31 formed adjacent to a back surface of the main valve 60, which is an opposite side on which the primary portion communicates with the secondary portion; the small hole 615 as the primary auxiliary flow path which is formed in the main valve 60 and increases the internal pressure of the back pressure chamber 31 by allowing water to flow from the primary space 103 to the back pressure chamber 31 therethrough; the secondary auxiliary flow path (the through hole 4612, the valve cover communication hole 305, the gap 113, and the valve base radial through flow path 1061) through which the liquid flows from the back pressure chamber 31 to the secondary space 104; the plunger 45 as the auxiliary valve which switches between shutoff and communication of the back pressure chamber 31 from and with the secondary flow path 112; and the auxiliary valve drive unit (the core 42, the coil 43, and the magnet 44) that drives the plunger 45 for the switching with the plunger 45. The secondary auxiliary flow path is not formed in the main valve 60 and is formed in the periphery of the main valve 60 so as to bypass the main valve 60.

With this configuration, since the secondary auxiliary flow path is formed in the periphery of the main valve 60 so as to bypass the main valve 60, it is possible to minimize the stoke of the plunger 45 driven up and down, for example, even when the plunger 45 and the main valve 60 are disposed coaxially. Accordingly, it is possible to realize the miniaturization and the power saving of the pilot solenoid valve 1. Namely, when the magnetic circuit constant is k, the number of turns of the coil 43 is n, the current supplied to the coil 43 is I, the contact area between the plunger 45 and the core 42 is St, and the stroke of the plunger 45 is L, the force F for driving the plunger 45 is expressed as below.

$$F = k(nI)^2 St/L^2$$

For this reason, F decreases in inverse proportion to the square of L as the stroke L of the plunger 45 increases. However, in some embodiments, since the stroke of the plunger 45 can be minimized, it is possible to realize the miniaturization and the power saving of the pilot solenoid valve 1. As a result, the pilot solenoid valve 1 can be used a cartridge type in a state in which the main body portion is easily inserted and fixed into the opening portion 901 of the tubular member 9. With the cartridge type, since the pilot solenoid valve 1 can be used while being assembled to various components and the pilot solenoid valve 1 can be easily separated, the maintenance of the pilot solenoid valve 1 can be easily performed.

Further, the pilot solenoid valve 1 includes the valve base 10 and the valve cover 30 as the main body portion for accommodating the main valve 60. The secondary auxiliary flow path is formed as the gap 113 between the outer surface of the main body portion and the tubular member 9 corresponding to the fixed member to which the main body portion is fixed. With this configuration, water can flow to the periphery of the main valve 60 so as to bypass the main valve 60 in the gap 113 formed between the outer surface of the main body portion and the tubular member 9 to which the main body portion is fixed.

Further, the upstream end portion of the secondary auxiliary flow path is provided with the seat portion 4611 which contacts the plunger 45 corresponding to the auxiliary valve and the downstream portion of the secondary auxiliary flow path in relation to the seat portion 4611 is provided with the enlarged diameter portion 4613 which gradually increases in diameter in a conical shape. With this configuration, it is possible to improve the responsiveness of the main valve 60 with respect to the operation of the plunger 45.

Namely, when the volume change of the back pressure chamber 31 at the time of moving the main valve 60 up and down is ΔV, the cross-sectional area of the through-hole 4612 of the seat portion 4611 is S, the flow rate coefficient is c, and the difference between the pressure of the back pressure chamber 31 and the pressure of the secondary auxiliary flow path is P1−P2, the time t until the main valve 60 opens after the auxiliary valve opens by the plunger 45 is expressed below.

$$t = \Delta V / Sc\sqrt{(P1-P2)}$$

Here, since the enlarged diameter portion 4613 is formed, the value of the flow rate coefficient c can be set to be large. Accordingly, it is possible to improve the responsiveness of the main valve 60 with respect to the operation of the plunger 45.

Further, the opening peripheral edge portion of the seat portion 4611 corresponding to the valve seat forming the opening of the upstream end portion of the secondary auxiliary flow path and contacting the plunger 45 corresponding to the auxiliary valve is provided with the reduced diameter portion 4616 which decreases in diameter from the upstream side toward the downstream side in the secondary auxiliary flow path. Namely, the opening peripheral edge portion of the seat portion 4611 is formed by the R-shaped curved surface which is continuous from the inside to the outside of the opening. In this way, when the continuous R-shaped curved surface is designed, it is possible to prevent deterioration in the responsiveness of the main valve 60.

Further, the diameter D of the enlarged diameter portion 4613 is larger than the diameter d of the upstream end of the reduced diameter portion 4616 in the secondary auxiliary flow path 122. When the diameter d is too large, the pilot solenoid valve 1 is not miniaturized even when the flow path closed by the plunger 45 is large, but with such a configuration, the pilot solenoid valve 1 can be miniaturized.

Further, the pilot solenoid valve 1 includes the coil portion 40 which includes the coil 43 for driving the plunger 45 as the auxiliary valve and the seat portion 4611 which is the valve seat contacting the plunger 45. The valve cover 30 includes the valve cover communication hole 305 which is the through-hole penetrating the valve base 10 constituting the main body portion in the diameter direction. The coil portion 40 includes the seat portion 4611. In some embodiments, in a case in which the secondary auxiliary flow path is relatively complex, when the seat portion of the auxiliary valve is long, the pressure of the back pressure chamber 31 increases. As a result, there is a possibility that a back pressure failure occurs. However, in some embodiments, even in the case of the configuration in which the valve cover communication hole 305 is provided at the downstream side of the through-hole 4612, penetrating downward from the seat portion 4611, so as to extend in the diameter direction as in the embodiment, the valve cover 30 is not provided with the seat portion and the coil portion 40 is provided with the seat portion 4611, so that the length of the through-hole 4612 corresponding to the secondary auxiliary flow path of the auxiliary valve is minimized and the pressure of the back pressure chamber 31 can be set to be lower than that of the secondary space 104. As a result, a back pressure failure can be prevented.

Further, the downstream end 1062 of the secondary auxiliary flow path corresponding to the opening of the secondary auxiliary flow path toward the secondary flow path 112 is located on the upstream side (the upper side in FIG. 8) in relation to the downstream end portion of the diaphragm plate 61 (the lower end portion 6111 of the diaphragm plate lower portion 611 in FIG. 8) in the flow of the water of the secondary space 104. With this configuration, the pressure of the secondary auxiliary flow path (the gap 113, the valve cover communication hole 305, the valve base radial through flow path 1061, and the through-hole 4612) becomes smaller than the pressure of the secondary flow path 112. Accordingly, the pressure of the back pressure chamber 31 communicating with the secondary auxiliary flow path also decreases and the opening degree of the main valve 60 can be increased, so that the flow rate performance can be improved.

The present invention is not limited to the above-mentioned embodiments, and contains modifications, improvements, and the like within the scope where it is possible to accomplish an object of the present invention. For example, the configuration of each of parts such as a main valve, an auxiliary valve, a primary auxiliary flow path, and a secondary auxiliary flow path is not limited to the configuration of each of the parts such as the main valve 60, the plunger 45, the small hole 615, and the secondary auxiliary flow path (the through hole 4612, the valve cover communication hole 305, the gap 113, and the valve base radial through flow path 1061) in the present embodiment.

In addition, for example, the plunger 45 and the diaphragm 63 are coaxially disposed with each other; however, the present invention is not limited to this configuration. In addition, the secondary auxiliary flow path is formed of the through hole 4612 of the seat portion 4611, the valve cover communication hole 305, the gap 113 between the outer surfaces of the valve cover 30 and the valve base 10 fixed to the tubular member 9 and the inner peripheral surface of the tubular member 9, and the valve base radial through flow path 1061; however, the present invention is not limited to this configuration. For example, the secondary auxiliary flow path may be formed of a groove formed in an outer surface of the main body portion formed of the valve cover and the valve base, instead of the gap 113 between the outer surfaces of the valve cover 30 and the valve base 10 fixed to the tubular member 9 and the inner peripheral surface of the tubular member 9. In addition, for example, the secondary auxiliary flow path may be another flow path through which the valve cover communication hole 305 communicates with the valve base radial through flow path 1061 and is formed inside the main body portion formed of the valve cover and the valve base, instead of the gap 113 between the outer surfaces of the valve cover 30 and the valve base 10 fixed to the tubular member 9 and the inner peripheral surface of the tubular member 9.

In addition, the drive method of the auxiliary valve drive unit is a latch type, but is not limited to this type. For example, the drive method of the auxiliary valve drive unit may be a continuous energization type in which the valve is in one state (for example, a valve open state) while the coil 43 is energized, and the valve is in the other state (for example, a valve closed state) while the coil 43 is not energized. In addition, the liquid is water, but is not limited to water. Further, the enlarged diameter portion 4613 gradually increases in diameter in a conical shape, but is not limited to this configuration. For example, the enlarged diameter portion may have a configuration or the like that spreads in a direction orthogonal to the axis of the through-hole. Further, the lower end portion of the cylindrical member 46 constituting the coil portion 40 is provided with the valve seat portion 461 which is integrally molded with the upper portion of the cylindrical member 46 supporting the coil 43 and constitutes a part of the cylindrical member 46, but is not limited to this configuration. The coil portion only has to include a valve seat. Further, the downstream end of the secondary auxiliary flow path which is the opening of the secondary auxiliary flow path toward the secondary flow path 112 is located on the upstream side (the upper side in FIG. 8) in relation to the downstream end portion of the diaphragm plate 61 (the lower end portion 6111 of the diaphragm plate lower portion 611 in FIG. 8) in the flow of the water of the secondary space 104, but only has to have such a positional relationship in a state in which at least the main valve 60 is closed. For example, in a full open state of the main valve 60, the downstream end of the secondary auxiliary flow path which is the opening of the secondary auxiliary flow path toward the secondary flow path 112 may be located on the downstream side (the lower side in FIG. 8) in relation to the downstream end portion of the diaphragm plate 61 in the flow of the water in the secondary space 104.

The invention claimed is:

1. A pilot solenoid valve assembly comprising:
a diaphragm portion;
a primary portion into which a liquid flows toward the diaphragm portion;
a secondary portion from which the liquid from the diaphragm portion flows;
a main valve comprising the diaphragm portion, configured to switch an interruption and a communication between the primary portion and the secondary portion;
a back pressure chamber which is formed on a rear surface side with respect to a communication side of the primary portion and the secondary portion in the main valve;
a primary auxiliary flow path which is formed in the main valve and allows the liquid to flow from the primary portion to the back pressure chamber so as to increase a pressure inside the back pressure chamber;
a secondary auxiliary flow path which allows the liquid to flow from the back pressure chamber to the secondary portion;
an auxiliary valve which switches an interruption and a communication between the back pressure chamber and the secondary auxiliary flow path;
an auxiliary valve drive unit which drives the auxiliary valve so as to perform the switching by the auxiliary valve; and
a main body portion which accommodates the main valve,
wherein the secondary auxiliary flow path is formed so as to bypass the main valve,
wherein in the main body portion, the secondary auxiliary flow path is formed between an outer surface of the main body portion and a fixed member to which the main body portion is fixed,
wherein the fixed member comprises a tubular member configured to allow the liquid to flow therethrough,
wherein the main valve includes a diaphragm which contacts a main valve seat portion and interrupts the primary portion and the secondary portion and a diaphragm plate which is fixed to the diaphragm and communicates the primary portion with the back pressure chamber, and
wherein at least two openings of the secondary auxiliary flow path toward the secondary portion are located on an upstream side in relation to a downstream end portion of the diaphragm plate in the flow of the liquid of the secondary portion, which further comprises at least two distally opposed radial through flow paths that respectively exit at the at least two openings.

2. The pilot solenoid valve assembly of claim 1, wherein the pilot solenoid valve is formed so as to be fixed to the fixed member including a flow path flowing into the primary portion and a flow path discharged from the secondary portion.

3. The pilot solenoid valve assembly of claim 1, wherein an upstream end portion of the secondary auxiliary flow path is provided with a valve seat which contacts the auxiliary valve and a downstream portion of the secondary auxiliary flow path in relation to the valve seat is provided with an enlarged diameter portion which gradually increases in diameter.

4. The pilot solenoid valve assembly of claim 1, wherein the upstream end portion of the secondary auxiliary flow path is provided with a valve seat which contacts the auxiliary valve and an opening peripheral edge portion of the valve seat which forms an opening of the upstream end portion of the secondary auxiliary flow path and contacts the auxiliary valve is provided with a reduced diameter portion which decreases in diameter from an upstream side toward a downstream side in the secondary auxiliary flow path.

5. The pilot solenoid valve assembly of claim 1, wherein
an upstream end portion of the secondary auxiliary flow path is provided with a valve seat which contacts the auxiliary valve,
a downstream portion of the secondary auxiliary flow path in relation to the valve seat is provided with an enlarged diameter portion which increases in diameter,
an opening peripheral edge portion of the valve seat which forms an opening of the upstream end portion of the secondary auxiliary flow path and contacts the auxiliary valve is provided with a reduced diameter portion which decreases in diameter from an upstream side toward a downstream side of the secondary auxiliary flow path, and
a diameter of a large diameter portion which is increased in diameter by the enlarged diameter portion is larger than a diameter of an upstream end of the reduced diameter portion in the secondary auxiliary flow path.

6. The pilot solenoid valve assembly of claim 1, wherein the main valve and the auxiliary valve are disposed coaxially.

7. The pilot solenoid valve assembly of claim 1, comprising:
a main body portion which accommodates the main valve; and
a valve seat which contacts the auxiliary valve,
wherein the main body portion includes a communication hole which penetrates the main body portion in a diameter direction,
wherein the auxiliary valve drive unit includes a coil portion with a coil for driving the auxiliary valve.

* * * * *